United States Patent [19]
Park et al.

[11] Patent Number: 5,832,843
[45] Date of Patent: Nov. 10, 1998

[54] WASTE GAS DISPOSAL APPARATUS AND METHOD OF THE SAME

[75] Inventors: Young-bae Park, Suwon; Sang-hoon Seo, Osan; Hyung-youl Kim, Suwon, all of Rep. of Korea

[73] Assignee: Kyung-Kyoon Kim, Kyonggi-do, Rep. of Korea

[21] Appl. No.: 788,075

[22] Filed: Jan. 22, 1997

[30] Foreign Application Priority Data

Jan. 23, 1996 [KR] Rep. of Korea .......................... 96-1363

[51] Int. Cl.[6] .................................. B01D 50/00; F23B 5/00
[52] U.S. Cl. ................................................ 110/214; 422/168
[58] Field of Search ...................... 110/212, 214, 110/216, 261, 262, 264, 265, 238; 422/168; 423/210.5

[56] References Cited

U.S. PATENT DOCUMENTS

| | | | |
|---|---|---|---|
| 4,858,538 | 8/1989 | Kuypers et al. | 110/264 |
| 4,928,615 | 5/1990 | Suwa et al. | 110/261 |
| 5,183,646 | 2/1993 | Anderson et al. | 423/210 |
| 5,588,381 | 12/1996 | Jennebach et al. | 110/213 |
| 5,645,802 | 7/1997 | Yanagioka et al. | 422/170 |
| 5,658,540 | 8/1997 | Valentino | 422/168 |

*Primary Examiner*—Teresa J. Walberg
*Assistant Examiner*—Gregory A. Wilson
*Attorney, Agent, or Firm*—Dann, Dorfman, Herrell and Skillman; Henry H. Skillman

[57] ABSTRACT

Disclosed is a waste gas disposal apparatus and method of the same which eliminates efficiently toxic components of waste gas resulted from semiconductor manufacture process prior to waste gas emission to the atmosphere, showing improvements in disposal efficiency, safety and costs.

This apparatus is comprised of an inlet head into which waste gas, inert gas and air are introduced, respectively; a heating chamber provided under the inlet head for heating up the incoming mixture gas from the inlet head to create reactant fine particles from a heating reaction; a reaction preventive unit provided in the heating chamber for making impossible to react the waste gas to the air at upper portion of the heating chamber; a scrubber unit connected to the heating chamber for scrapping off the solid dust particles adsorbed to the inner wall thereof; and a container connected to the scrubber unit by an engagement member for storing the off solid dust particles therein.

18 Claims, 9 Drawing Sheets

WASTE GAS DISPOSAL APPARATUS AND METHOD OF THE SAME

BACKGROUND OF THE INVENTION

The present invention relates generally to a waste gas disposal apparatus and method of the same which eliminates efficiently toxic components of waste gas resulted from semiconductor manufacture process prior to waste gas emission to the atmosphere.

DESCRIPTION OF THE PRIOR ART

In the manufacturing process of semiconductor devices, various gases such as toxic, corrosive or inflammable gases are used. For example, in CVD process, a large quantity of silane, dichloro silane, ammonia, oxide of nitrogen arsine, porphin, diboron, boron, trichloride, etc. are required. However, practically used quantity is very small, and most of gas is exhausted, which includes toxic components of relatively high concentration. Moreover, various processes such as low pressure CVD, plasma-enhanced CVD, plasma etching, epitaxial deposition generate various poisonous waste gases.

Recently, as people are becoming enthusiastic about environmental issues, waste gas disposal has been dealt with as one of key issues. Under regulations governing waste gas disposal in existence, it is under an obligation to remove toxic components of the waste gas prior to waste gas emission to the atmosphere. In view of this, various researches and many efforts have been pursued to better waste gas disposal, particularly in a field of the semiconductor manufacture process. However, in fact, any efficient results has not been made and there includes some disadvantages.

Typical waste gas disposal is performed through two methods, wet and dry.

The former is to scatter water into the waste gas and then collect toxic particles reactive to the water. This shows a prominent efficiency in toxic components emission, but includes various disadvantages: drains can be damaged by the residue from the process, outlet ducts can be corroded because of water particles scattering toward outlet passages, and removal of toxic reactants and water-soluble pollutants from the waste water is required prior to the waste water emission, bringing many inefficient problems.

FIG. 1 is a schematical diagram of the typical wet type disposal apparatus. The wet apparatus is comprised of an inlet chamber 220 for introducing waste gas and air therein; a heating chamber 204 provided under the inlet chamber 220 for heating up the incoming mixture gas from the inlet chamber 220; a mixing chamber 208 provided under the heating chamber 204 for mixing the heated gas and water; a collecting pipe 207 provided under the mixing chamber 208; a drain 209 for exhausting collected materials to the outside therethough.

In such a apparatus, collection of the toxic components is performed as below.

The incoming waste gas via a waste gas introducing pipe 201 and the incoming air via an air introducing pipe 202 are mixed in the inlet chamber 220 and transmitted to the heating chamber 204. The mixture gas is heated up by a heating coil 205 in the heating chamber 204. It is noted that the heating coil can be arranged at inside or outside the heating chamber 204, or on the sidewall of the heating chamber 204, but in this example in the wall. Next, water is scattered at high speed via a nozzle 206 formed at one end of a water introducing pipe 203 which is positioned at a central top of the mixing chamber 208, and the mixture gas of high temperature reacts to the water droplets, producing solid or liquid toxic materials. The reacted materials and unreacted intoxious gas are then introduced the collecting pipe 207. In next step, the former is discharged to the outside via the drain 209 while the latter via an outlet pipe 210 and the outlet duct extending therefrom.

However, in this apparatus, the partial scattered water bounds from the sidewall of the heating chamber 204 and reacts to the mixture gas of high temperature in the heating chamber 204, thereby forming scales on the inner sidewall of the heating chamber 204. As a result, heat efficiency of the heating coil 205 decreases and the expected equipment's life also shorten. Further, the partial resultant materials are adsorbed to inner surface of the collecting pipe 207 and the drain 209, bringing a difficulty in emitting the waste gas with a higher possibility of erosion.

FIG. 2 is a schematical diagram of the typical dry type disposal apparatus. In this view, the dry apparatus is comprised of a mixing unit 303, a combustion chamber 304 under the mixing unit 303, an eduction chamber 305 under the combustion chamber 304, a container 308 for receiving the resultant materials therein, an outer wall 309 surrounding the entire units for introducing cooling air 307 to the space defined by the outer wall 309, mixing with purified gas and guiding the mixture to the outlet duct.

In such a constructed apparatus, the waste gas disposal is carried out as below.

Firstly, the incoming waste gas via a waste gas introducing pipe 301 and the incoming gaseous fuel such as LNG, LPG via a fuel introducing pipe 302 are mixed by the mixing unit 303, transmitted to the combustion chamber 304 and then ignited by a combustion unit not shown in the combustion chamber 304, At this step, toxic components in the waste gas, for example, silane, are ignited with oxide or air, producing very fine silicon dioxide particles. Such formed particles fall down along the inner sidewall 313 of the eduction chamber 305 by a cone-shaped guide 306 in the eduction chamber 305 rotated by a motor not shown and hence are collected in the container 308. The purified gas 315 after combustion step is mixed with the cooling air 307 introduced through a slot 316 formed between the outer sidewall 309 and the container 308, the mixture is transmitted to the duct 314 via a space between the inner sidewall 313 and the outer sidewall 309, refiltered in the duct and then exhausted to the outer. In FIG. 2, the reference numeral 310 denotes a scrapper for scraping off the particles attached on the sidewall to collect in the container 308.

However, in this apparatus, a frequently encountered problem is that the educed particles block the combustion unit, bringing troubles of the unit. Further, scrupulous system management are required since inflammable gases having possibility of explosion at all times are used, and fuel consumption costs are also considerably large.

SUMMARY OF THE INVENTION

In view of the above, it is an object of the present invention to provide a waste gas disposal apparatus showing improvements in disposal efficiency, safety and costs.

According to one aspect of this invention, it is provided a waste gas disposal apparatus which is comprised of an inlet head into which waste gas, inert gas and air are introduced, respectively; a heating chamber provided under the inlet head for heating up the incoming mixture gas from the inlet head to create reactant fine particles from a heating reaction;

a reaction preventive unit provided in the heating chamber for making impossible to react the waste gas to the air at upper portion of the heating chamber; a scrubber unit connected to the heating chamber for scrapping off the solid dust particles adsorbed to the inner wall thereof; and a container connected to the scrubber unit by an engagement member for storing the off solid dust particles therein.

According to another aspect of this invention, it is provided a waste gas disposal method comprises the steps of: introducing waste gas, inert gas and air, respectively; preventing the introduced waste gas and air from reacting to remove possibility of explosion; heating up the waste gas and air to create fine particles from the heating reaction; scrapping off the solid particles from the inner wall; exhausting the purified gas and storing the off solid particles in the container.

DETAILED DESCRIPTION OF THE PREFERRED EMBODIMENTS

This invention will be more clearly understood below with reference to the appending drawings.

Figure 1:
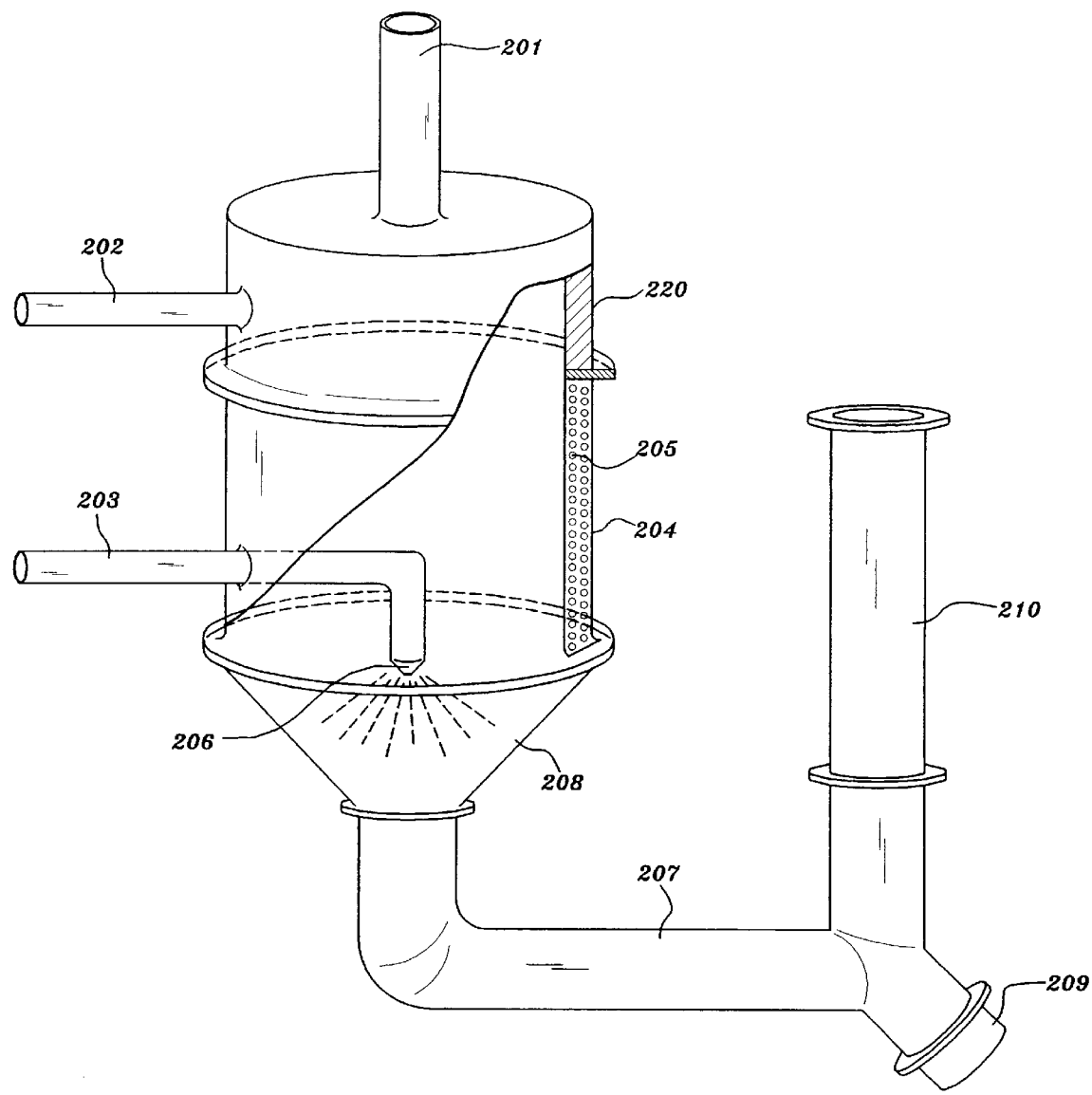
FIG. 1 is a perspective view, partly in section of a typical prior art wet type waste gas disposal apparatus.
Figure 2:
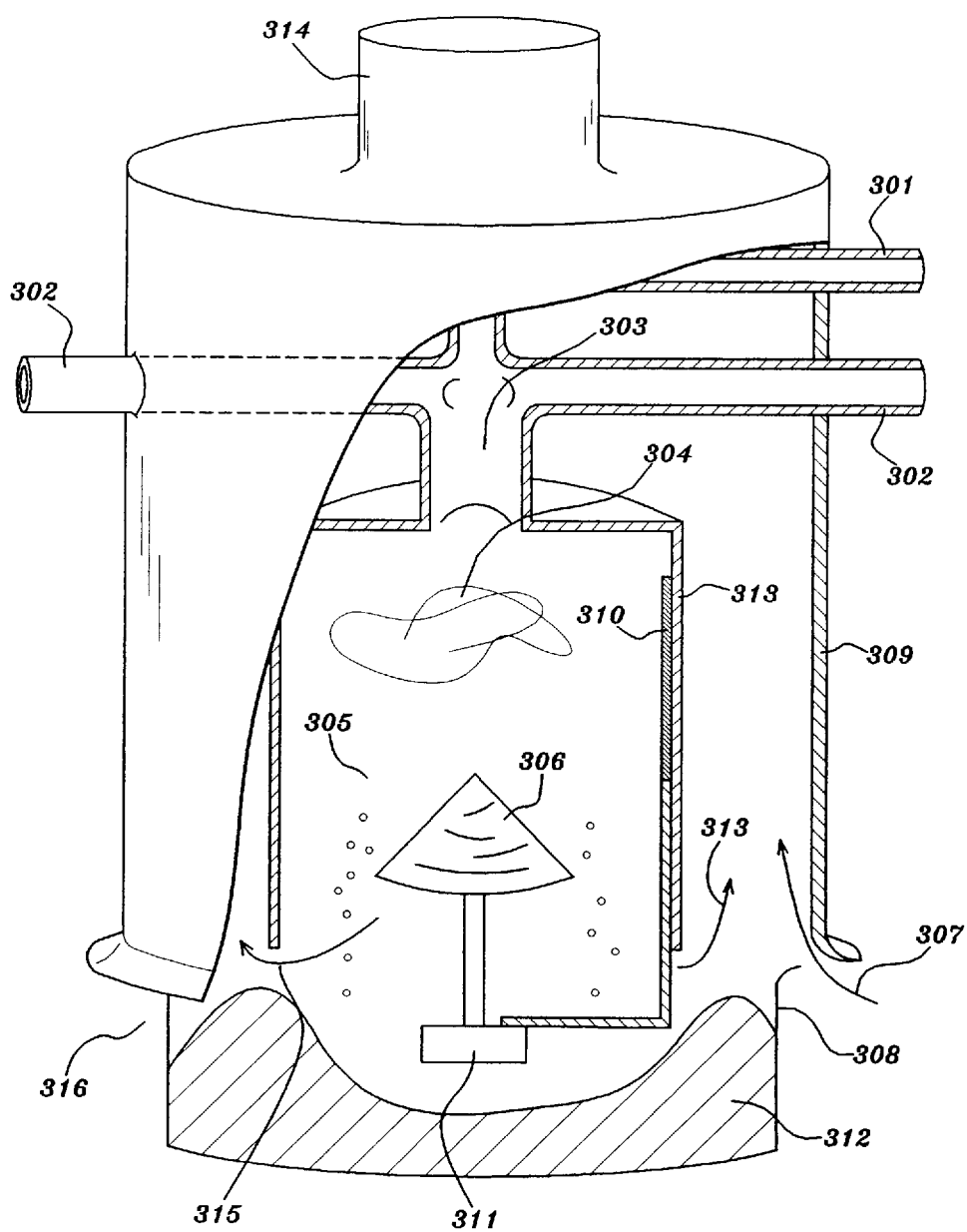
FIG. 2 is a perspective view, partly in section of a typical prior art dry type waste gas disposal apparatus.
Figure 3:
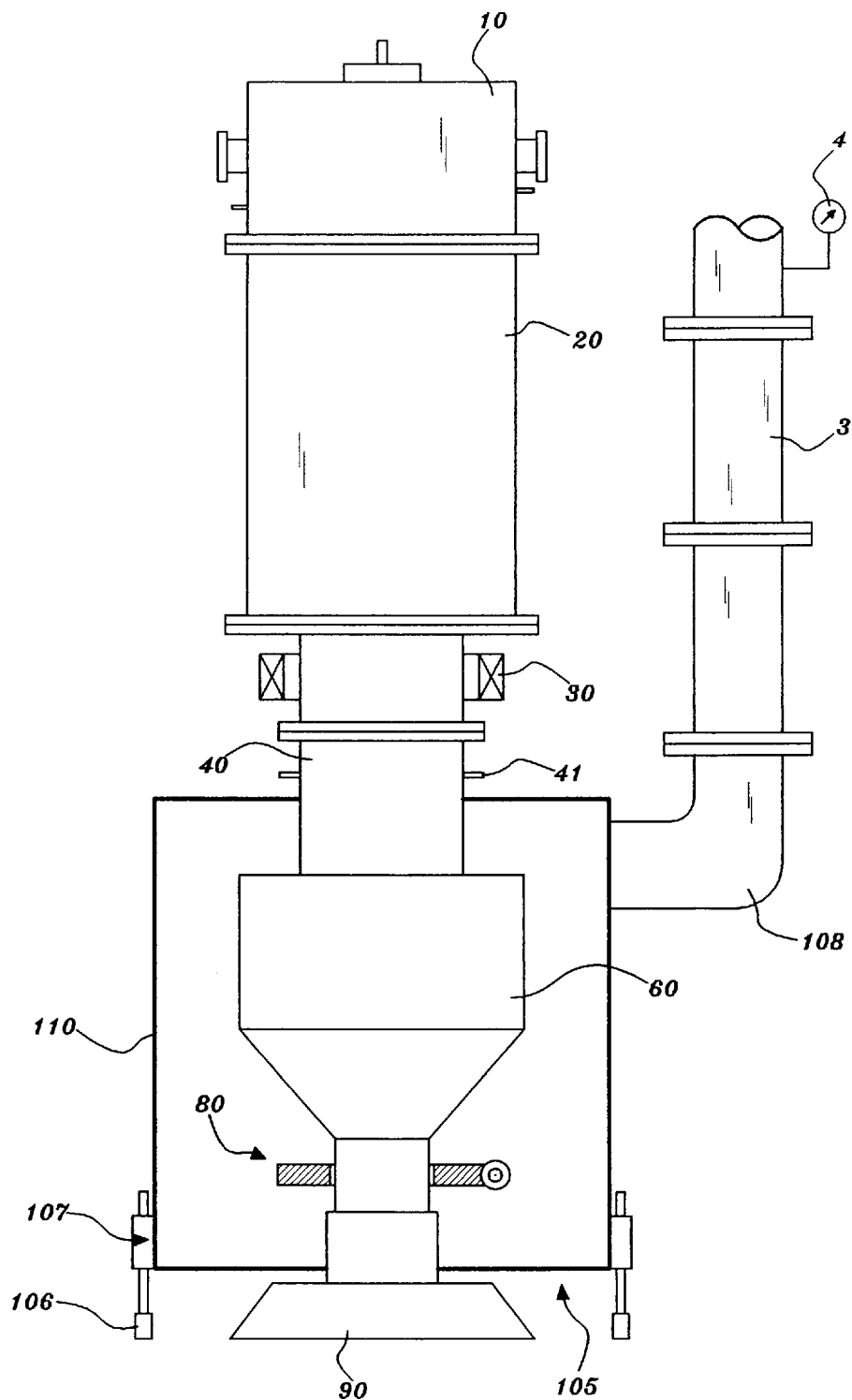
FIG. 3 is a schematic elevational view of this waste gas disposal apparatus.

Referring first to the construction of FIG. 3, the waste gas disposal apparatus of this invention includes an inlet head 10 into which waste gas, inert gas, in particular nitrogen, air are introduced, respectively; a heating chamber 20 provided under the inlet head 10 for heating up the incoming mixed gases from the inlet head 10; a reaction preventive unit provided in the heating chamber for making impossible to react the waste gas to the air at upper portion of the heating chamber; a scrubber unit 60 for scraping off the solid particles; and a container 90 for storing the off particles therein.

Furthermore this invention includes a reheating unit 30 for heating up the previously heated gas again; a second air inlet unit 40 for introducing the air again to react the heated mixture gas with newly incoming air therethrough.

The manner of operation of such a constructed apparatus is described below.

The incoming waste gas via the inlet head 10 is transmitted to a reaction preventive unit 80 by the inert gas including nitrogen N, the reaction preventive unit 80 permitting the waste gas to react to air below any desired height of the heating chamber 20 while preventing such a reaction above the desired height.

After the reaction in the heating chamber 20, resultant fine dust particles and gas are preferably heated up again by the reheating unit 30 and then transmitted to the scrubber unit 60 by rapidly incoming air through the air inlet 40.

Finally, the particles introduced into the scrubber unit 60 is collected and settled into the container 90, while the purified gas is emitted from the container 90 via holes not shown formed at upper portion thereof and exhausted to the outside via a gap between the chamber shell 110 and the scrubber unit 60 along the cooling air introduced from the outside.

Figure 4:
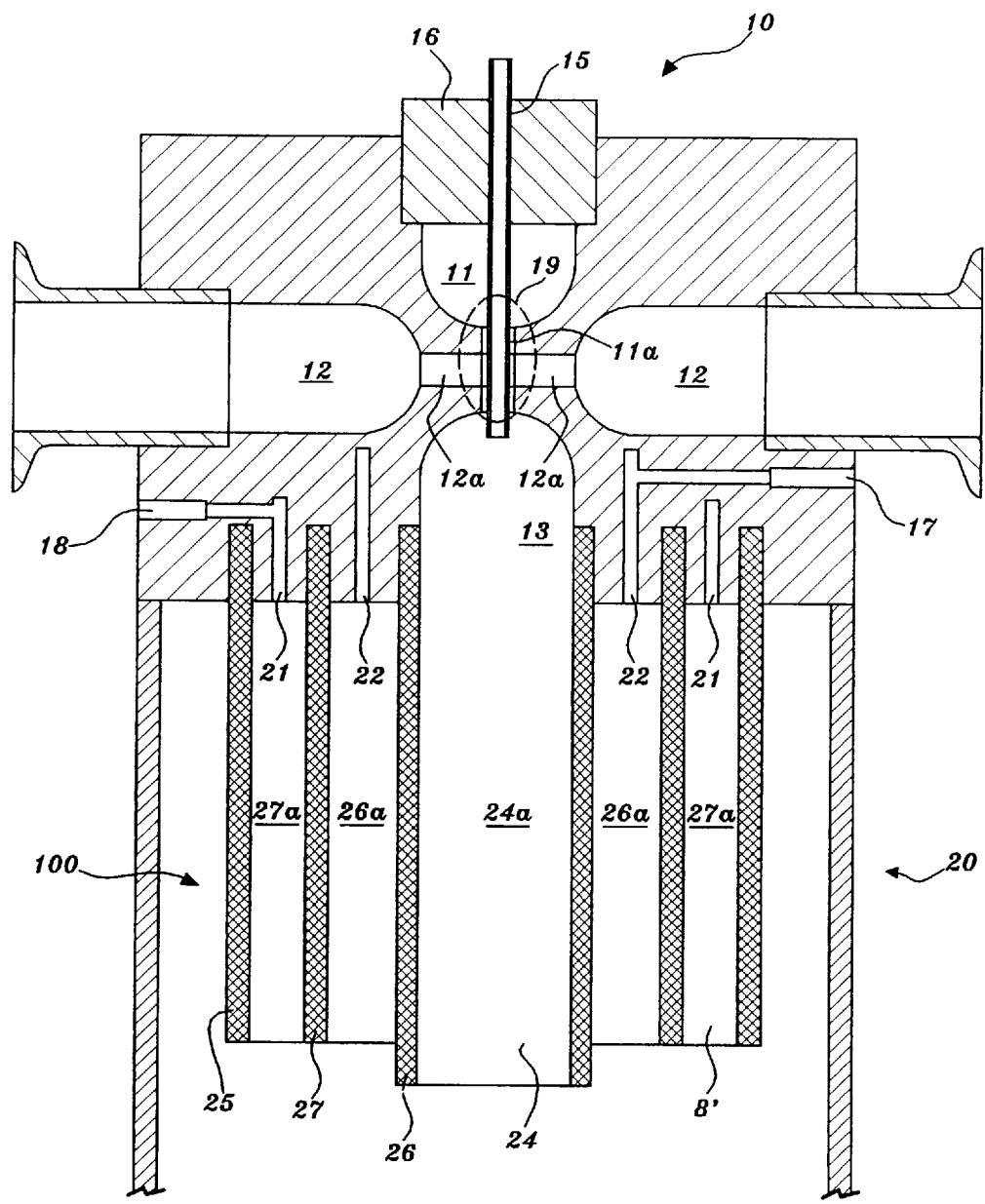
FIG. 4 is a cross sectional view of an inlet head and a reaction preventive unit of this invention.
Figure 5:
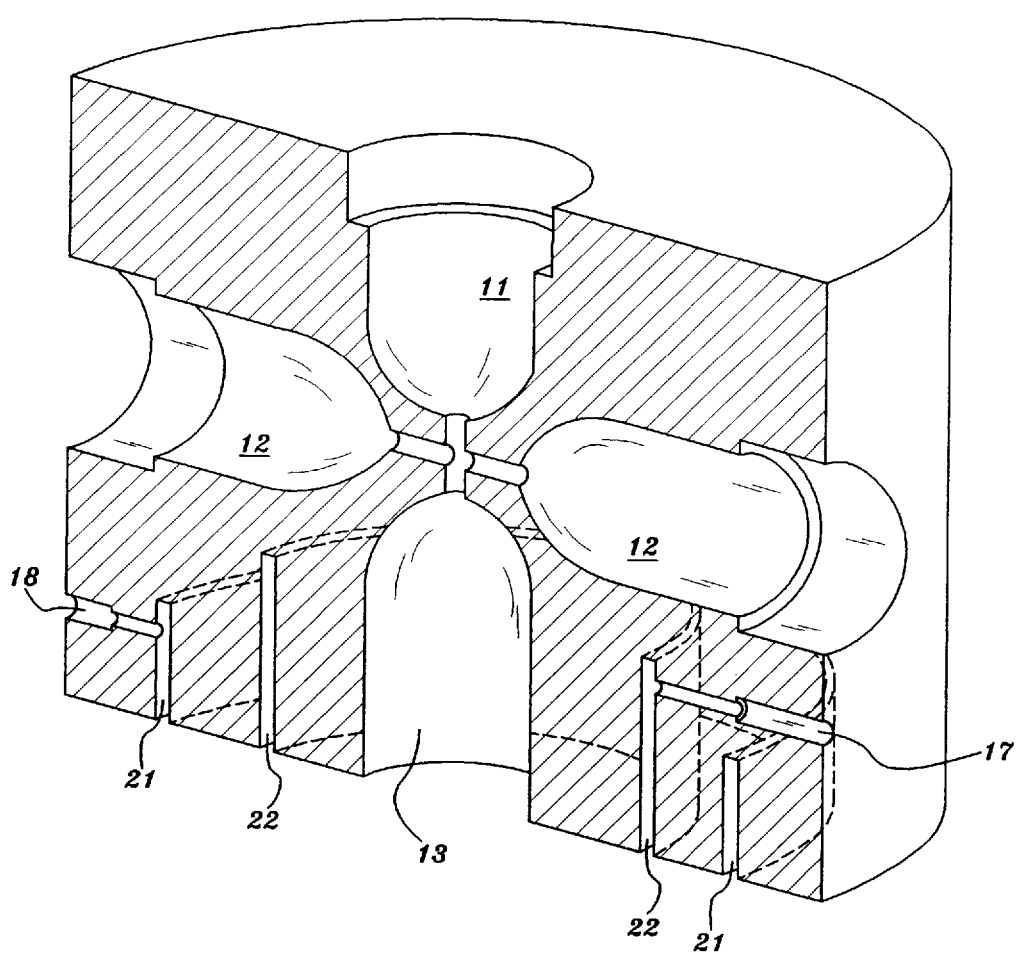
FIG. 5 is a perspective view, partly in section illustrating gas pipes, an inert gas entering hole, an air entering hole in an inlet head of this invention, in detail.

FIG. 4 illustrates a scheme of the inlet head 10 and the reaction preventive unit and FIG. 5 is a perspective view of the inlet head 10, partly in section, for more detailed description of that means.

As shown in these figures, there is radially provided at least one waste gas inlet 12 at sidewall of the cylindrical inlet head 10 toward a center point thereof. At the bottom center of the inlet head 10, a mixed gas outlet 13 is formed to exhaust the mixture gas in the inlet head 10 to the outside. Further, a buffering hole 11 opposite to the outlet 13 is provided at the upper center of the inlet head 10. A first extension 12a and a second extension 11a are connected as a cross shape at a region 19 circled by a dot line as shown in FIG. 4. In this embodiment, to obtain more powerful exhaust energy, the first extension 12a having a diameter smaller than the waste gas inlet 12 are provided between the waste gas inlets 12, but such holes 12a become unnecessary if the waste gas inlet 12 is designed to have a taper shape. And the second extension 11a has a diameter smaller than the buffer hole 11. At the region 19, the buffer hole 11 and the outlet 13 have diameters nearly identical with the extension holes 12a. The upper opening of the buffer hole 11 is covered with a rubber-made closing member 16. An inert gas inlet tube 15 through which nitrogen and the others being introduced is formed to be extended up to inside of the outlet 13, penetrating the closing member 16, a diameter thereof being smaller than those of the second extension 11a. The inert gas inlet tube 15 is arranged to be lower than a center of the first extension 12a, preferably extended up to the inside of the outlet 13. The inert gas introduced via the tube 15 reduces the pressure of the region 19, whereby the incoming waste gas via the waste gas inlet 12 is transmitted to the outlet 13 passing through the region 19. That is, the waste gas flows toward the region 19 depend upon a difference of pressure between the waste gas inlet 12 and the region 19, and then finally arrives at the outlet 13 with the inert gas.

At the top of the heating chamber 20, a reaction preventive unit 100 is provided to prevent the mixture of the inert gas and the waste gas from reacting to the air instantly. The reaction preventive unit 100 is comprised of a plurality of partitions 25, 26, 27 centering around the outlet 13 with regular intervals therebetween, and a plurality of ringshaped outlets 21, 22 through which any desired gas is introduced to paths 26a, 27a defined by the partitions 25, 26, 27. A first partition 26 produces a first path 24a by surrounding the waste gas outlet 13, guiding the waste gas mixed with the inert gas from the outlet 13. By a second partition 27 formed with a predetermined distance from the first partition 26, a second path 26a is produced, and the inert gas from the roundshaped inert gas outlet 22 is guided therethrough. By a third partition 25 formed with a predetermined distance from the partition 27, a third path 27a is produced, and the air from the roundshaped air outlet 21 is guided therethrough. The first, second and third paths 24a, 26a, 27a have cylindrical shape because the entire partitions are formed centering around the mixed gas outlet 13 with regular intervals therebetween as mentioned above. The outlets 21 and 22 are connected to the air inlet 18 and the inert gas inlet 17, respectively. The length of the first partition 26 is not important whether it is longer or shorter than those of the other partitions, but if possible it is desirable to be longer than the other partitions.

Provided the inert gas is introduced via the tube 15 at high speed, there is generated a difference of pressure between the region 19 and the waste gas inlet 12, so that the incoming waste gas via the waste gas inlet 12 flows to the mixed gas outlet 13 passing through the first extension 12a and gap between the inert gas inlet tube 15 and the inlet head 10. Next, the waste gas and inert gas are mixed in the mixed gas outlet 13. This mixture gas is guided to the first path 24a by the first partitions 26. The speedily incoming inert gas via the inert gas inlet 17 is guided to the second path 26a formed between the first partition 26 and the second partition 27, passing through the round-shaped inert gas outlet 22, while the speedily incoming air via the air inlet 18 is guided to the third path 27a formed between the second partition 27 and the third partition 25, passing through the round-shaped air outlet 21. In this step, the inert gas is guided in the second path 26a at high speed and thus surrounds the mixture gas in the first path 24a, forming a block layer which guides the mixture gas to a predetermined point, preventing the mixture gas from dispersing radially. On the other hand, the incoming air in the third path 27a also flows to a predetermined point in the heating chamber, while being isolated from the mixture gas by the inert gas layer. Next, the block layer is removed at the predetermined point where speed of the inert gas becomes slow, whereby the reaction of the mixture gas and the air. Since the reaction is induced slowly in that manner, possibility of explosion by silicon based compounds in the atmosphere is nearly removed, confirming the safety in process. Each gas is dispersed via the respective paths in nearly same amount, so that the reaction efficiency is enhanced. In addition, since the waste gas is induced by the inert gas, simplification of the construction is realized and thus system troubles are reduced.

The waste gas mixed with the air is heated up by the heating coil not shown in the heating chamber 20, gas burner not shown and the other heating units, and thus the toxic components of the waste gas show the heating reaction. As a result, the fine dust particles are produced by the reaction and settled down on the bottom of the heating chamber 20. To be noted that this resultant particles include no toxic component, differently with the waste gas before the reaction.

The mixture gas including the dust particles is then reheated by the reheating unit 30 which can be one of popular used heating units. As a result, there is no blocking by cooling of the mixture and no formation of scales and the other problems. Moreover, the toxic components and the air are ceaselessly reacted by this reheating step so that the toxic components unreacted in the heating chamber 20 are finally reacted without exception.

A desirable construction is provided by mounting at least one air nozzle 41 at the sidewall of the second air inlet unit 40 which is communicably connected to the bottom of the reheating unit 30. Through this nozzle 41, the air is dispersed downwards. The air accelerates the current of the mixture gas including the dust particles in the heating chamber 20 and the reheating unit 30, leading the mixture gas to an additional reaction.

Figure 6:
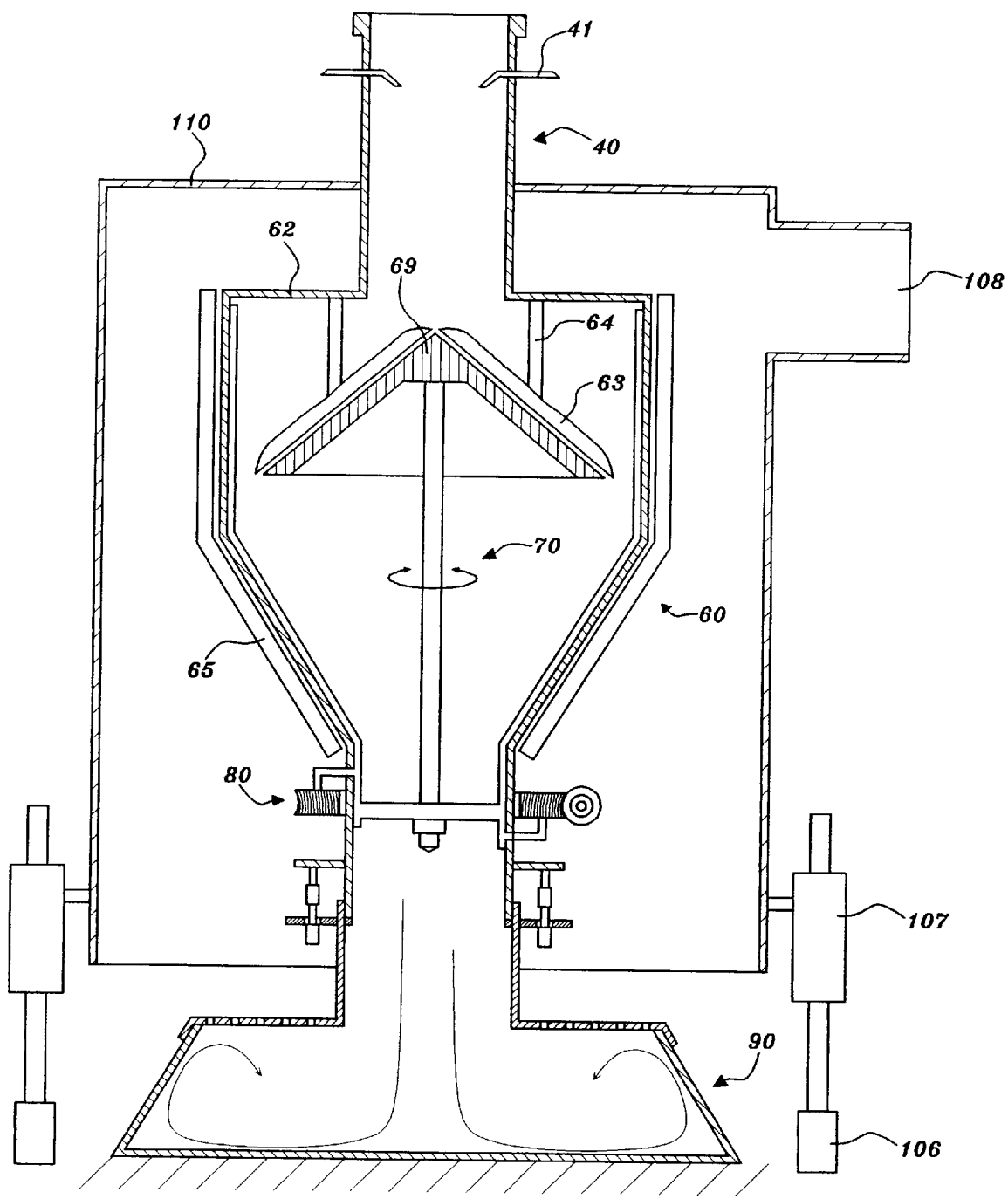
FIG. 6 is a cross sectional view of a scrubber unit and a container of this invention.

FIG. 6 shows an inner scheme of the scrubber unit 60. Referring to this view, the scrubber unit 60 is provided under the second air inlet unit 40 to be communicated therewith, including a hopper chamber 62, a scraper 70 for scraping off the solid dust particles adsorbed to the inner wall of the hopper chamber 62, and a driving means 80 for driving the scraper 70. Also, a cooling unit 65 can be arranged on the outer wall of the hopper chamber 62, If so, the hopper chamber 62 becomes cool and the resultant particles is efficiently adsorbed to the inner wall of the hopper chamber 62, improving the collection efficiency.

Figure 7:
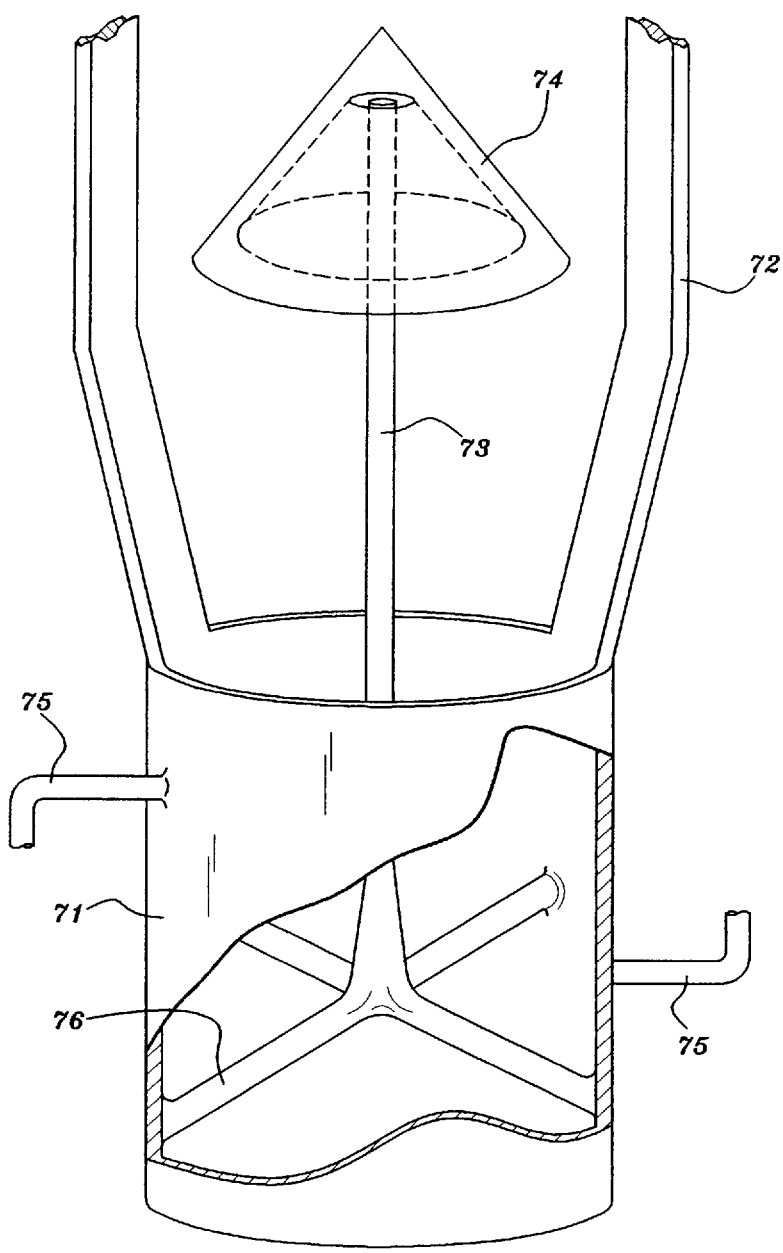
FIG. 7 is a perspective view, partly in section, for illustrating a scraper of this invention.

Next, with reference to FIG. 7, the scraper 70 is comprised of a cylindrical body 71, at least one blade 72 extended from one end of the body 71, at least one power transmitting unit 75 fixed to the base 71 for transmitting the driving force of a driving unit 80, a rod 73 arranged at a central portion of the body 71 vertically, one end of the rod being fixed to a guide cone 74 and the other to the body 71. Desirably, as shown in FIG. 6, to scrape off the solid dust particles adsorbed to the guide cone 74, at least one scraper blade 63 is secured to the upper inner wall of the hopper chamber 62 by support members 64. Once introduced into the hopper chamber 62, the particles becomes nearly impossible to flow upward again since the guide cone 74 guides the particles around the bottom inner wall of the hopper chamber 62. The solid particles on the inner wall of the hopper chamber 62 are scraped off and settled down passing through the cylindrical body 71. Accordingly, it is desirable to design the body to have the largest possible inner area. For this reason, the rod 73 are secured to the body 71 by the four bars 76 crossed this embodiment as shown in FIG. 7 but it is desirable to employ the fewest possible bar. The blade 72 is desirable to have a shape corresponding to a section of the hopper chamber 62 to fix closely to the inner wall of the hopper chamber 62.

Figure 8:
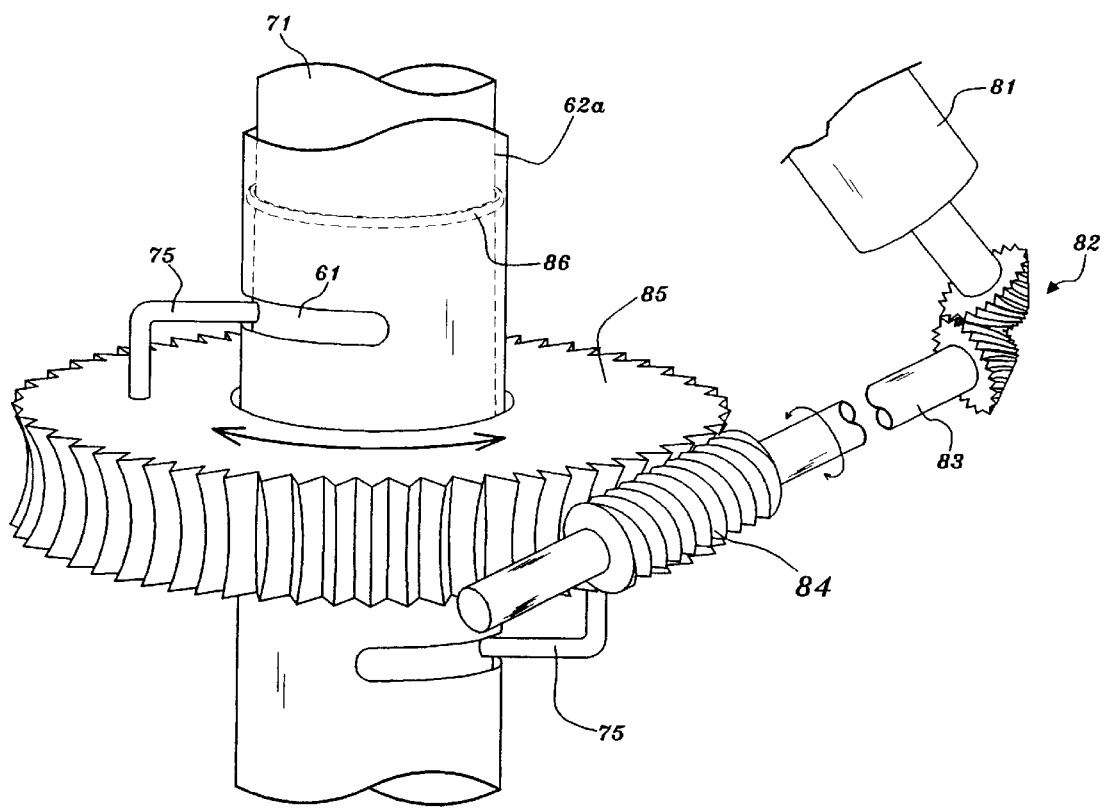
FIG. 8 is a perspective view for illustrating a driving unit of this invention.

In FIG. 8, the driving unit 80 is comprised of a motor 81, a bevel gear 82 for transmitting the driving force of the motor to a rotation axis 83 by reversing by 90°, a worm 84 fixed to the rotation axis 83, and a worm wheel 85 engaged with the worm 84, surrounding a chamber neck 62a which is lower portion of the hopper chamber 62. The motor 81 rotates, reversing its rotational direction repeatedly. Also, there is provided at least one transmitting unit 75 between the worm wheel 85 and the cylindrical body 71 of the scraper 70 to transmit the rotation force of the motor 81 to the blade 72, passing the chamber neck 62a. To ensure a space permitting rotational movement of the transmitting unit 75 by a predetermined angle, a slot 61 is formed along the circumferential surface of the chamber neck 62a, having a predetermined circumference angle. This circumference angle determined in accordance with the length of the slot 61 is related with the number of scraper blades 63. For example, if two scraper blades 63 are provided as this embodiment, the circumference angle of the slot 61 must be above 180° in order that the scraper blades 63 are rotated by at least 180° reversing repeatedly to scrape the entire inner wall of the hopper chamber 62.

Additionally, there is a gap between the chamber neck 62a and the body 71 to permit the rotational movement of the body 71, through which the mixture gas can be leakaged. To remove such a possibility, a soft rubber-made ring 86 is provided at the lower or upper portion, or both portions of the slot 61. To reverse the rotational movement of the motor 81, repeatedly, in relation to the length of the slot 61, a limit switch (not shown) is provided at one end of the slot 61. That is, if the switch is turned on or off by the transmitting unit 75, a controller (not shown) senses the end portion of the slot 61 and reverses the rotational movement of the motor 81.

Figure 9:
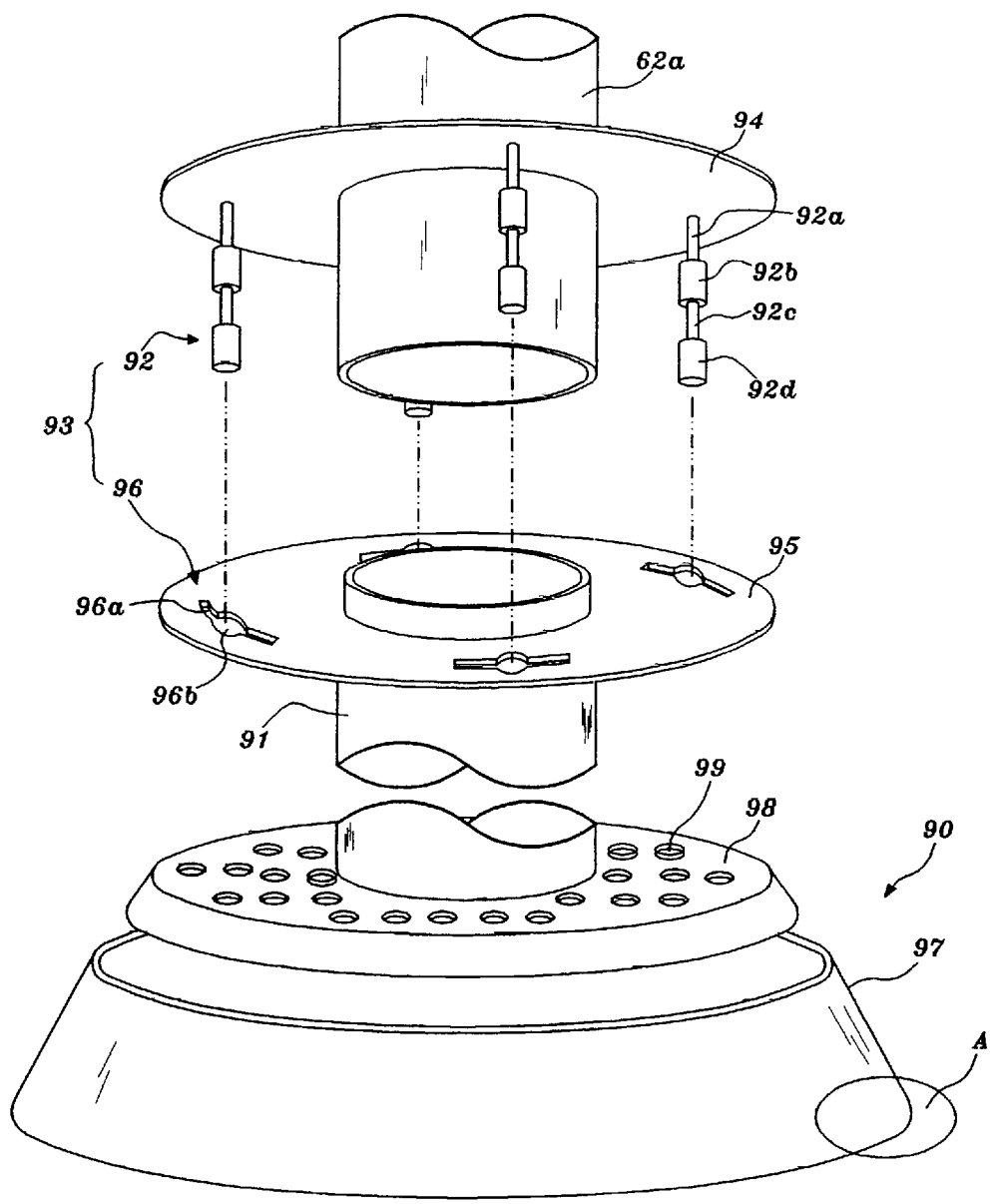
FIG. 9 is a perspective view illustrating a unit combining a container and a chamber according to the present invention.

FIG. 9 is a exploded perspective view to show an unit for connecting the container 90 and the hopper chamber 62. Referring to this view, the connection unit is comprised of a first support plate 94 spaced from the end of the chamber neck 62a by a predetermined distance, a second support plate 95 spaced from one end of a guide cylinder 91 of the container 90, two support plates 94 and 95 being opposites, and a locking member 93 having a locking rod 92 formed at the first support plate 94 and a locking slot 96 formed at the second support plate 95. The first and second support plates 94, 95 have each predetermined thickness. The locking rod 92 includes a first, second, third and fourth rods 92a, 92b, 92c, 92d and the locking slot 96 having a first slot 96a with a diameter corresponding to the first and third rods 92a, 92c and a second slot 96b having a diameter corresponding to the second and fourth rods 92b, 92d, the first rod 92a extending downward from the first support plate 94, a second rod 92b extending from the first rod 92a and having a diameter larger than that of the first rod 92a, a third rod 92c extending from the second rod 92b and having a diameter equal to the first rod 92a, and a fourth rod 92d extending from the third rod 92c and having a diameter equal to the second rod 92b. The slot 96 equals to the rod 92 in number. The diameter of the chamber neck 62a under the first support plate 94 is smaller than that of the guide cylinder 91.

The engagement of the hopper chamber 62 and the container 90 by the locking member 93 is obtained by firstly inserting the chamber neck 62a to the guide cylinder 91 by a predetermined length, the locking rod 92 to the second slot 96b at the same time, and turning the cover 98 of the container 90 to the right or left until the third rod 92c is located in the first slot 96a. In this manner, the cover 98 of the container is engaged to the fourth rod 92d through the first slot 96a formed on the second plate support plate 95.

Figure 10:
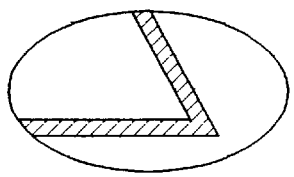
FIG. 10 is an enlarged sectional view of the part encircled at A in FIG. 9.

The container 90 is comprised of the guide cylinder 91, the cover 98 undividable from the cylinder 91 and the storage 97. The cover 98 includes a plurality of holes 99 to raise the purified gas therethrough. The edge of the cover 98 is cut off in order that the upper surface thereof has a diameter smaller than that of the lower surface. Further, a desirable storage 97 is designed in a manner that a bottom thereof makes an acute angle with a side wall thereof, as a circled portion A in FIG. 9 and an enlarged view of the same FIG. 10. This can prevent the solid particles accumulated in the storage 97 from raising along the exhausting gas. Another desirable storage is made of transparent materials or has a window on the sidewall thereof to observe the amount of the solid particles with eyes.

When any need to change or clean the storage due to long term usage may be generated, such can be satisfied with very simple operations. That is, the cover 98 is turned to the right or left to cooperate with the fourth locking rod 92d with the second locking slot 96b, and then raised, turned again to the right or left to when the first rod 92a is inserted to the second slot 96b. The second rod 92b is stepped by the first slot 96a, so that the cover is separated from the storage 97 and changing or cleaning is available.

The gas passing through holes 99 is mixed with the cooling air incoming via a gap between the container 90 and the chamber shell 100, filtered by the exhaust outlet 108 and exhausted to the atmosphere.

In this invention, a control unit 107 and a roller 106 are further provided under the apparatus to adjust the height of this apparatus.

The resultant apparatus can remove the possibility of explosion, one of problems of the dry type apparatus, by employing the reaction preventive unit not permitting a reaction at the upper of the heating chamber. In addition, problems such as formation of scales and waste water disposal which are generated in wet type, are completely solved. The reaction rate of the waste gas and air is improved by the reheating unit, and fluent flow of the mixture of the waste gas and air is ensured by introducing the air additionally through the air inlet. The cooling coil provided on the outer portion of the hopper chamber lowers drastically the temperature of the waste gas after the reaction to enable the reactant particles to be adsorbed to the inside of the hopper chamber, thus improving collection efficiency. Moreover, since the entire steps are performed in a closed state, once purified gas does not require additional purification steps. Further, the construction of this apparatus ensures simple detachment and engagement of the storage and the cover. The bottom edge of the storage are formed to have an acute angle, so that the collected solid particles do not scatter with the purified gas along the inner wall of the storage.

What is claimed is:

1. A waste gas disposal apparatus comprises:

an inlet head into which waste gas, inert gas and air are introduced, respectively;

a heating chamber provided under the inlet head for heating up the incoming mixture gas from the inlet head to create reactant fine particles from a heating reaction;

a reaction preventive unit provided in the heating chamber for making impossible to react the waste gas to the air at upper portion of the heating chamber;

a reheating unit for heating up the previously heated gas again;

a second air inlet unit for introducing the air again to react the heated mixture gas with newly incoming air;

a scrubber unit connected to the heating chamber for scraping off the solid dust particles adsorbed to the inner wall thereof; and a container connected to the scrubber unit by an engagement member for storing the off solid dust particles therein.

2. A waste gas disposal apparatus of claim 1, wherein the inlet head is comprised of:

at least one waste gas inlet at sidewall of the inlet head for introducing waste gas therethrough;

a mixed gas outlet at the bottom center of the inlet head for exhausting mixture of the waste gas and inert gas;

a buffer hole at the upper center of the inlet head, opposite to the outlet, for buffering the incoming waste gas; and a region where said waste gas inlet, said mixed gas outlet and said hole connected as a cross shape.

3. A waste gas disposal apparatus of claim 2, wherein an upper opening of the buffer hole is covered with a closing member and an inert gas inlet tube is formed to be extended to the mixed gas outlet, penetrating the closing member.

4. A waste gas disposal apparatus of claim 2, wherein the reaction preventive unit is comprised of:

a plurality of partitions centering around the mixed gas outlet with regular intervals therebetween; and a plurality of ringshaped outlets for introducing any desired gas to paths defined by the partitions.

5. A waste gas disposal apparatus of claim 4, wherein the plurality of ringshaped outlets are comprised of:

an inert gas outlet from which the inert gas is emitted to the reaction preventive unit; and an air outlet.

6. A waste gas disposal apparatus of claim 5, wherein the plurality of partitions are comprised of:
   a first partition which produces a first path by surrounding the mixed gas outlet;
   a second partition formed with a predetermined distance from the first partition, producing a second path by surrounding the inert gas outlet hole: and
   a third partition formed with a predetermined distance from the second partition, producing a third path by surrounding the air outlet.

7. A waste gas disposal apparatus of claim 6, wherein the first partition is longer than the second and the third partitions.

8. A waste gas disposal apparatus of claim 1, wherein the scrubber unit is comprised of:
   a hopper chamber having a neck at the lower portion thereof;
   a scraper for scraping off solid dust particles adsorbed to the inner wall of the hopper chamber; and
   a driving means for driving the scraper.

9. A waste gas disposal apparatus of claim 8, wherein the scraper is comprised of;
   a cylindrical body;
   at least one scraper blade extended from one end of the body;
   at least one power transmitting unit fixed to the body for transmitting the driving force of the driving unit; and
   a rod arranged at a central portion of the body vertically, one end of the rod being fixed to a guide cone and the other to the body.

10. A waste gas disposal apparatus of claim 9 which further comprises;
    at least one scraper blade for scraping off the solid particles adsorbed to the guide cone; and
    a support member for securing the scraper blade to the inner wall of the hopper chamber.

11. A waste gas disposal apparatus of claim 8, wherein the driving unit is comprised of:
    a motor;
    a bevel gear for transmitting the driving force of the motor to a rotation axis;
    a worm fixed to the rotation axis; and
    a worm wheel engaged with the worm, surrounding the neck rotatable.

12. A waste gas disposal apparatus of claim 8 which further comprises;
    a cooing unit surrounding outer portion of the hopper chamber.

13. A waste gas disposal apparatus of claim 1, wherein the engagement member is comprised of;
    a first support plate spaced from the end of the chamber neck by a predetermined distance;
    a second support plate spaced from one end of a guide cylinder of the container, opposite to the first support plate; and
    a locking member having a plurality of locking rods formed at the first support plate and a plurality of locking slots formed on the second support plate.

14. A waste gas disposal apparatus of claim 13, wherein each of the locking rods includes a first, second, third and fourth rods and each of slots includes a first slot and a second slot,
    the first rod extending downward from the first support plate, a second rod extending from the first rod and having a diameter larger than that of the first rod, a third rod extending from the second rod and having a diameter equal to the first rod, a fourth rod extending from the third rod and having a diameter equal to the second rod,
    the first slot having a diameter corresponding to the first and third slots and a second slot having a diameter corresponding to the second and fourth rods.

15. A waste gas disposal apparatus of claim 1, wherein the container is comprised of;
    a guide cylinder;
    a cover undividable to the guide cylinder, of which edge is cut off; and
    a storage dividable from the cover.

16. A waste gas disposal apparatus of claim 15, wherein the cover includes a plurality of holes to raise the purified gas therethrough, and is formed to make an acute angle between the side wall thereof and the bottom of the storage.

17. A waste gas disposal method comprises the steps of:
    introducing waste gas, inert gas and air, respectively;
    preventing the introduced waste gas and air from reacting at the point of introduction of the waste gas to remove possibility of explosion;
    heating up the waste gas and air downstream of the point of introduction to create fine particles from the heating reaction;
    reheating the mixture gas including the resultant particles;
    introducing the air through the air inlet to accelerate and react again to the newly incoming air;
    scraping off the solid particles from the inner wall of a chamber; and
    exhausting the purified gas and storing the off solid particles in the container.

18. A waste gas disposal method of claim 17, wherein the explosion preventive step forms a block layer of the inert gas between the waste gas and the air at the upper portion of a heating chamber to prevent reaction therebetween.

* * * * *